United States Patent
Dognin et al.

(10) Patent No.: US 11,550,782 B2
(45) Date of Patent: Jan. 10, 2023

(54) MACHINE LEARNING SYSTEMS AND METHODS FOR INTERACTIVE CONCEPT SEARCHING USING ATTENTION SCORING

(71) Applicant: Insurance Services Office, Inc., Jersey City, NJ (US)

(72) Inventors: Charles Dognin, Paris (FR); Zhuoqin Yu, Jersey City, NJ (US); Hewen Chen, Weehawken, NJ (US); Shikha Bordia, Jersey City, NJ (US); Ashish Nangpal, Belle Mead, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/547,784

(22) Filed: Dec. 10, 2021

(65) Prior Publication Data

US 2022/0188305 A1 Jun. 16, 2022

Related U.S. Application Data

(60) Provisional application No. 63/123,881, filed on Dec. 10, 2020.

(51) Int. Cl.
*G06F 16/24* (2019.01)
*G06F 16/242* (2019.01)

(52) U.S. Cl.
CPC ................ *G06F 16/2428* (2019.01)

(58) Field of Classification Search
CPC . G06F 16/2433; G06F 16/243; G06F 16/2428
See application file for complete search history.

(56) References Cited

U.S. PATENT DOCUMENTS

| | | | |
|---|---|---|---|
| 7,536,413 B1 | 5/2009 | Mohan et al. | |
| 2011/0191372 A1 | 8/2011 | Kaushansky et al. | |
| 2020/0133946 A1* | 4/2020 | Kim | G06F 16/3334 |
| 2020/0210526 A1* | 7/2020 | Leibovitz | G06N 3/08 |

OTHER PUBLICATIONS

International Search Report of the International Searching Authority dated Feb. 22, 2022, issued in connection with International Application No. PCT/US2021/62829 (3 pages).

(Continued)

*Primary Examiner* — Log Tran
(74) *Attorney, Agent, or Firm* — McCarter & English, LLP

(57) ABSTRACT

Machine learning systems and methods for interactive concept searching using attention scoring are provided. The system receives textual data. The system identifies one or more word representations of the textual data. The system further receives a concept. The system determines a score indicative of a likelihood of each of the one or more word representations being representative of the concept using an attention scoring process having a temperature variable. The system generates a dataset for training and evaluation based at least in part on the score. The dataset includes the one or more word representations and concept. The system further processes the dataset to train one or more deep active learning models capable of the interactive concept search.

27 Claims, 15 Drawing Sheets

(56) References Cited

OTHER PUBLICATIONS

Written Opinion of the International Searching Authority dated Feb. 22, 2022, issued in connection with International Application No. PCT/US2021/62829 (4 pages).

Kiros, et al., "Unifying Visual-Semantic Embeddings with Multimodal Neural Language Models," arXiv:1411.2539v1, Nov. 10, 2014, https://arxiv.org/pdf/1411.2539.pdf (13 pages).

Kennedy, et al., "Constructing Interval Variables via Faceted Rasch Measurement and Multitask Deep Learning: A Hate Speech Application," arXiv:2009.10277v1, Sep. 22, 2020, https://arxiv.org/pdf/2009.10277.pdf (35 pages).

Jang, et al., "Bi-LSTM Model to Increase Accuracy in Text Classification: Combining Word2vec CNN and Attention Mechanism," Appl. Sci. 2020, https://www.mdpi.com/2076-3417/10/17/5841 (14 pages).

Malhotra, et al., "Entropy Optimized Semi-Supervised Decomposed Vector-Quantized Variational Autoencoder Model Based on Transfer Learning for Multiclass Text Classification and Generation," arXiv:2111.08453v1, Nov. 10, 2021, https://arxiv.org/pdf/2111.08453.pdf (12 pages).

Uehara, et al., "Unsupervised Keyword Extraction for Full-Sentence VQA," arXiv:1911.10354v3, Oct. 12, 2020, https://arxiv.org/pdf/1911.10354.pdf (12 pages).

* cited by examiner

| Concept | Endorsements | Reference Clause |

☑ Concept Form Search ☐ Concept Search

Concept Item

| Betterment ▼ |

Found 3 Matches

| Match 3 ▼ |

Form

| 143907608_MT 03 02 12 13 (Coverage For Dama ▼ |

Is selected match relevant?
[Yes] [No] [Unsure]

POLICY NUMBER: MOTORCYCLE
MT 03 02 12 13
THIS ENDOESEMENT CHANGES THE POLICY. PLEASE READ IT CAREFULLY.
COVERAGE FOR DAMAGE TO YOUR MOTORCYCLE (MAXIMUM LIMIT OF LIABILITY)

FIG. 2A

| Run Concept | Train data |

Concept betterment ▼     Get Training Questions     ☐Yes ☐No ☐Unsure payments for loss covered under collision coverage, other than collision coverage, and additional equipment and custom parts coverage are subject to the following provisions: no more than one deductible under part d shall be applied to any one covered loss. if loss to more than one auto covered under part d results from the same collision, only the highest applicable deductible under part d will apply if coverage applies to a non-owned auto, we will provide the broadest coverage applicable to any auto show on the declarations page. however, the highest deductible on any covered auto shall apply if stated amount coverage is elected by you for a covered auto, the stated amount is the most we will pay for all loss to the covered auto, including its additional equipment and custom parts an adjustment for depreciation or physical condition, which may also be referred to as betterment, wear and tear, or a prior damage, will be made in determining the limits of liability. if a repair or replacement results in better than like kind or quality, we will not pay for the amount of the betterment. betterment for which you will be responsible includes, but is not limited to: the value relating to the increase in useful life of replaced parts that have a limited useful life; and the increase in value from the repair of prior damage

FIG. 2B

User Validation

Concept: betterments     Phrase: betterment     Positive Labels : 0     Negative Labels : 0 betterment for which you will be responsible includes, but is not limited to the value relating to the incease in useful life of replaced parts that have a limited useful life and the incease in value from the repair of prior damage.

☐ Yes ☐ No ☐ Unsure our limit of liability for loss to your insured vehicle or accessories will be reduced by the deductible shown on the declarations (2) betterment deductions for depreciation based on condition, mileage, expected useful life and age just prior to the loss any amount of any unrepaired prior loss or damage.

☐ Yes ☐ No ☐ Unsure our limit of liability for damage to your trailer is the lesser of the amount necessary to repair the damaged property or replace with like, kind and quality deductions for betterment and depreciation will be applied based on the useful life, age and condition just prior to loss.

☐ Yes ☐ No ☐ Unsure

[Discard Phrase] [Save Training Data]

[Cancel]

FIG. 7C

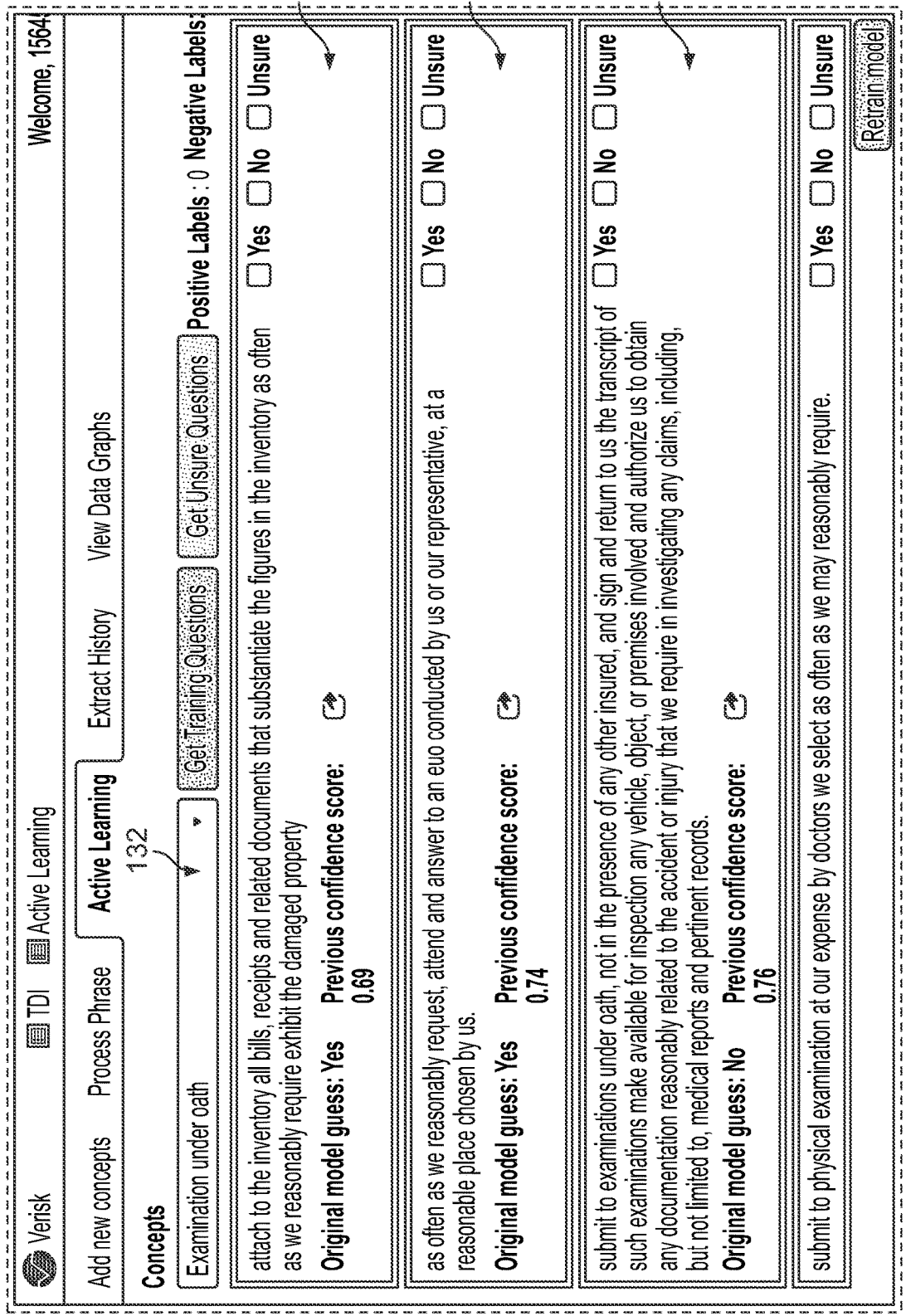

| | Verisk | ▦ TDI  ▦ Active Learning | | | Welcome, 1564 |
|---|---|---|---|---|---|
| Add new concepts | Process Phrase | Active Learning | Extract History | View Data Graphs | |
| Concepts<br>— Select Concept — ▼ 142 | | Phrase: 144<br>[_____] [Add] | | | |
| Current Status: | | | | | 146 |

| Concepts | Phrases | Fixed Test Set Accuracy | Automated Test Set Accuracy | Iteration | Status |
|---|---|---|---|---|---|
| Examination under oath | 1. Examination under oath | 0.97 ▦ | 0.96 ▦ | 4 | ready for active learning ▦ |
| Newly acquired vehicle | 1. Newly acquired vechicle | 0.96 ▦ | 0.96 ▦ | 4 | ready for active learning ▦ |
| Betterment | 1. Betterment | 0.86 ▦ | 0.95 ▦ | 4 | ready for active learning ▦ |
| Rideshare | 1. Rideshare<br>2. Transportation network company | 0.96 ▦ | 0.98 ▦ | 3 | ready for active learning ▦ |

Verisk — ▣ TDI ▣ Active Learning — Welcome, 156

| Validation | Concept | Endorsements | Reference Clause | Sample |

☑ Concept Form Search ☐ Concept Search — 152

Concept Item
Betterment ▾ — 154

Found 6 Matches
Match 1 ▾ — 156

Form (860 forms found)
144968684_MT 03 17 12 13 (Electronic Equipment Coverag ▾ — 158

[Search]

Form Details:

| Title | Edition date | Form number |
|---|---|---|
| Electronic Equipment Coverage | 12 13 | MT 03 17 |

B. With respect to Electronic Equipment Coverage provided under Paragraph I.A.2 of this endorsement, the Limit Of Liability Provision of Part D is replaced by the following: Limit Of Liability — 160

1. Our limit of liability for the total of all losses to electronic equipment as a result of any one occurrence shall be the lesser of the:
  a. Limit Of Liability shown in the Schedule or in the Declarations for Electronic Equipment;
  b. Actual cash value of the stolen or damaged property; or
  c. Amount necessary to repair or replace the property with other property of like kind and quality.  —  Label 2. An adjustment for depreciation and physical condition will be made in determining actual cash value in the event of a total loss.  —  Label 3. If a repair or replacement results in better than like kind or quality, we will not pay for the amount of the betterment.  —  Label

150

MACHINE LEARNING SYSTEMS AND METHODS FOR INTERACTIVE CONCEPT SEARCHING USING ATTENTION SCORING

RELATED APPLICATIONS

This application claims priority to U.S. Provisional Patent Application Ser. No. 63/123,881 filed on Dec. 10, 2020, the entire disclosure of which is hereby expressly incorporated by reference.

BACKGROUND

Field of the Disclosure

The present disclosure relates generally to the field of machine learning. More specifically, the present disclosure relates to machine learning systems and methods for interactive concept searching using attention scoring.

Related Art

The field of machine learning has grown tremendously over the past few years. Of particular interest in this field is the desire to make computer systems more adept at searching for desired terms in textual data. Examples of existing machine learning technologies that have applicability in this field include natural language processing (NLP), unsupervised learning, and deep active learning, among other technologies.

A particular problem with the foregoing machine learning technologies is that they often cannot adequately discern concepts from textual data, nor are they capable of being efficiently trained to identify concepts. For example, in the insurance underwriting business, it would be beneficial for a machine learning system to quickly and rapidly identify insurance-related data (e.g., appropriate insurance forms, legal language, clauses, etc.) by only having to specify a high-level concept, such as a newly-acquired vehicle, instead of having to specify more detailed criteria. To date, existing machine learning systems cannot adequately analyze large bodies of textual insurance data using such high-level concepts, and require time- and processor-intensive learning cycles using more granular training data and criteria.

Still further, existing systems do not adequately leverage the benefits of both unsupervised learning and deep active learning in a single system. Instead, they often rely only on a single type of machine learning. Additionally, the concept of "temperature" in machine learning, wherein convergence of machine learning systems can be optimized by properly specifying a temperature value that controls the output probability distribution of the classifier. The lower the temperature parameter, the more confident and "peaked" the distribution will be. The higher the temperature parameter, the smoother and flat the distribution will be. This technique does not receive adequate consideration in the design of machine learning systems. Indeed, the use of attention scoring techniques that properly harness temperature could drastically increase the speed and efficiency of machine learning systems, and in particular, could greatly increase the ability of machine learning systems to learn and identify high-level concepts in large corpuses of textual data.

Accordingly, what would be desirable are machine learning systems and methods for interactive concept searching using attention scoring, which address the foregoing and other needs.

SUMMARY

The present disclosure relates to machine learning systems and methods for interactive concept searching using attention scoring. The system includes an unsupervised machine learning model that executes on a computer system and identifies word representations from large corpuses of data (such as insurance-related data), an attention scoring subsystem which scores the word representations using an attention scoring algorithm having a temperature parameter to generate automated training and evaluation data sets, and a deep active learning subsystem which processes the automated training and evaluation sets to train one or more deep active learning models capable of interactively searching for high-level concepts in data. The system also provides a graphical user interface which allows a user to define high-level concepts for training of the machine learning system, and to manage training of the system.

BRIEF DESCRIPTION OF THE DRAWINGS

The foregoing features of the disclosure will be apparent from the following Detailed Description, taken in connection with the accompanying drawings, in which:

FIGS. 2A-2B are diagrams illustrating user interface screens generated by the system for allowing users to define high-level concepts for training of the machine learning system of the present disclosure;

FIGS. 7A-7G are screenshots illustrating graphical user interface screens generated by the system for allowing a user to define high-level concepts for training of the machine learning system, and to manage training of the system.

DETAILED DESCRIPTION

The present disclosure relates to machine learning systems and methods for interactive concept searching using attention scoring, as discussed in detail below in connection with FIGS. 1-8.

Figure 1:
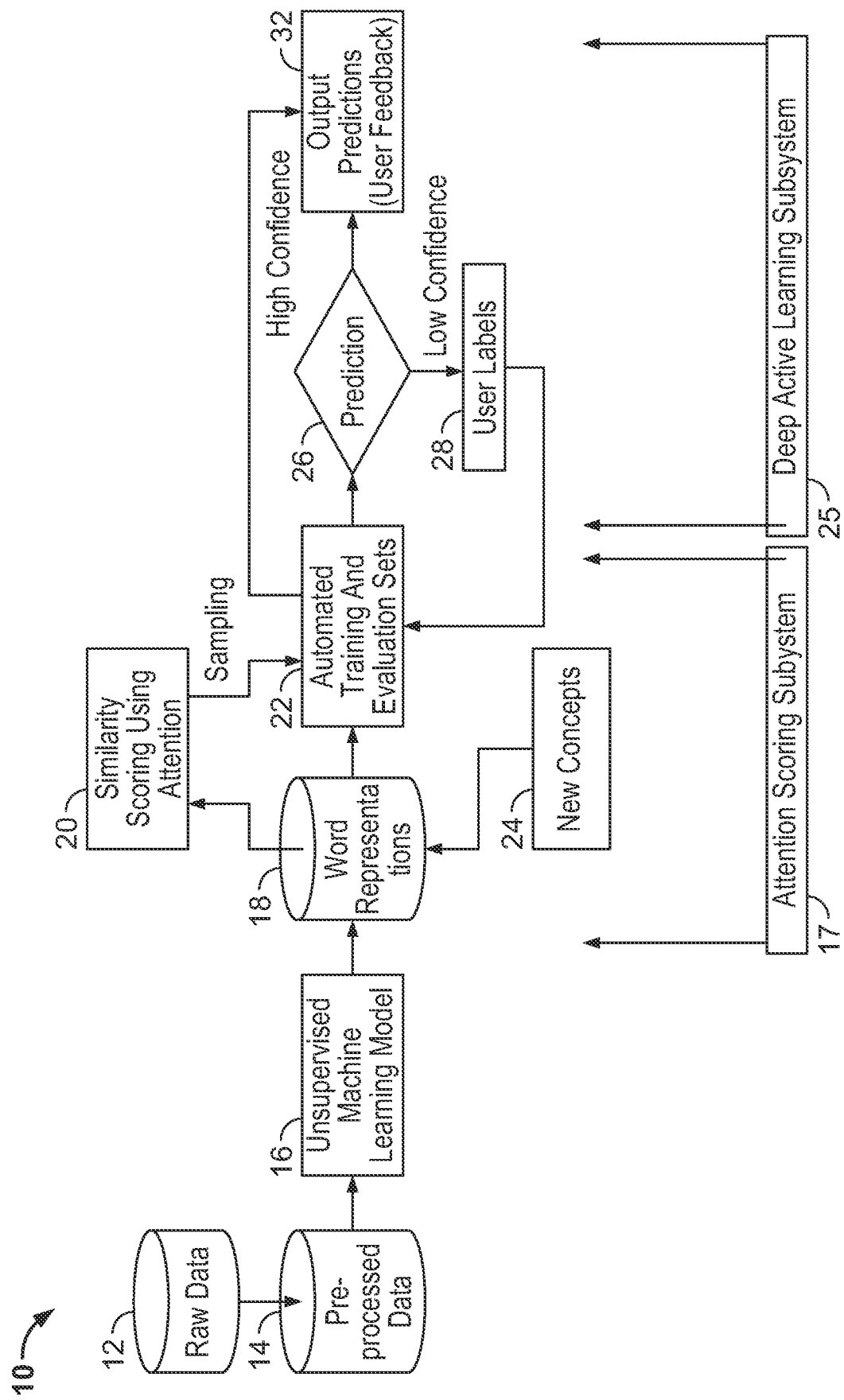
FIG. 1 is a diagram illustrating the machine learning system of the present disclosure.

FIG. 1 is a diagram illustrating the machine learning system of the present disclosure, indicated generally at 10. The system 10 includes an unsupervised machine learning model 16, an attention scoring subsystem 17, and a deep active learning subsystem 25. Raw textual data 12 (which can be stored and/or retrieved from a database) is processed by the system into pre-processed data 14. Specifically, the raw data 12 is processed to remove special characters, convert all uppercase letters to lowercase, and to replace rare words with a token, such as "<UNK>." Additionally, the system could remove stop words from the raw data, if desired. The unsupervised machine learning model 16 processes the pre-processed data 14 to identify word representations in the data 14, and stores the word representations in a database 18. The model 16 could identify word representations by implementing a skip-gram unsupervised model (e.g., using the FastText open-source software package, or other suitable software package) to learn the representation of words in the data 14.

The attention scoring subsystem 17 scores the word representations stored in the database 18 using an attention scoring process 20. As will be discussed in greater detail below, the attention scoring process scores each word representation using an attention scoring algorithm having a temperature parameter, in order to score the likelihood of the word representations being representative of a desired concept. The output of the scoring process 20 is sampled by the subsystem 17 and stored as automated training and evaluation data sets 22. Additionally, the scoring subsystem 17 can process data 24 relating to new concepts (which could be specified by the user), so as to enhance the ability of the system to learn new concepts from textual data.

The deep active learning subsystem 25 applies a deep learning algorithm to the automated training and evaluation data sets 22 in order to learn concepts from training and evaluation data sets 22. The subsystem 25 makes a prediction of whether data from the training and evaluation data sets 22 has a high confidence or a low confidence of being representative of a concept. If the confidence is low (e.g., less than a threshold value), the subsystem 25 allows the user to engaging in a labeling process 28, wherein a user can review the training and evaluation data 22 and manually label whether the data is representative of a particular concept. If the confidence is high (e.g., equal to or greater than a threshold value), the subsystem 25 outputs a prediction 32 and solicits user feedback on the prediction (e.g., to verify the prediction and/or to provide further feedback on the prediction). The prediction is then stored in the training and evaluation sets 22 and utilized in further training of the deep active learning subsystem 25. As will be discussed in greater detail below, the system 10 generates a plurality of graphical user interface screens that allow the user to interact with the deep active learning subsystem 25, to allow for interactive concept searching by the user, and to interact with, monitor, and control the training process.

FIGS. 2A-2B are diagrams illustrating user interface screens generated by the system for allowing users to define high-level concepts for training of the machine learning system of the present disclosure. As can be seen in FIG. 2A, the screen 40 allows the user to conduct a concept search by specifying a concept item, and optionally, to specify a textual form (e.g., an insurance-related form) through which to search for the concept. The matches can be returned to the user, and the user can provide feedback to the system 10 on whether the matches are relevant. As can be seen in FIG. 2B, the screen 42 allows a user to retrieve one or more training questions that can be used to train the system 10, and to provide feedback on whether a particular portion of text is or is not representative of a concept, or whether the user is unsure whether the text is representative of the concept.

Figure 3:
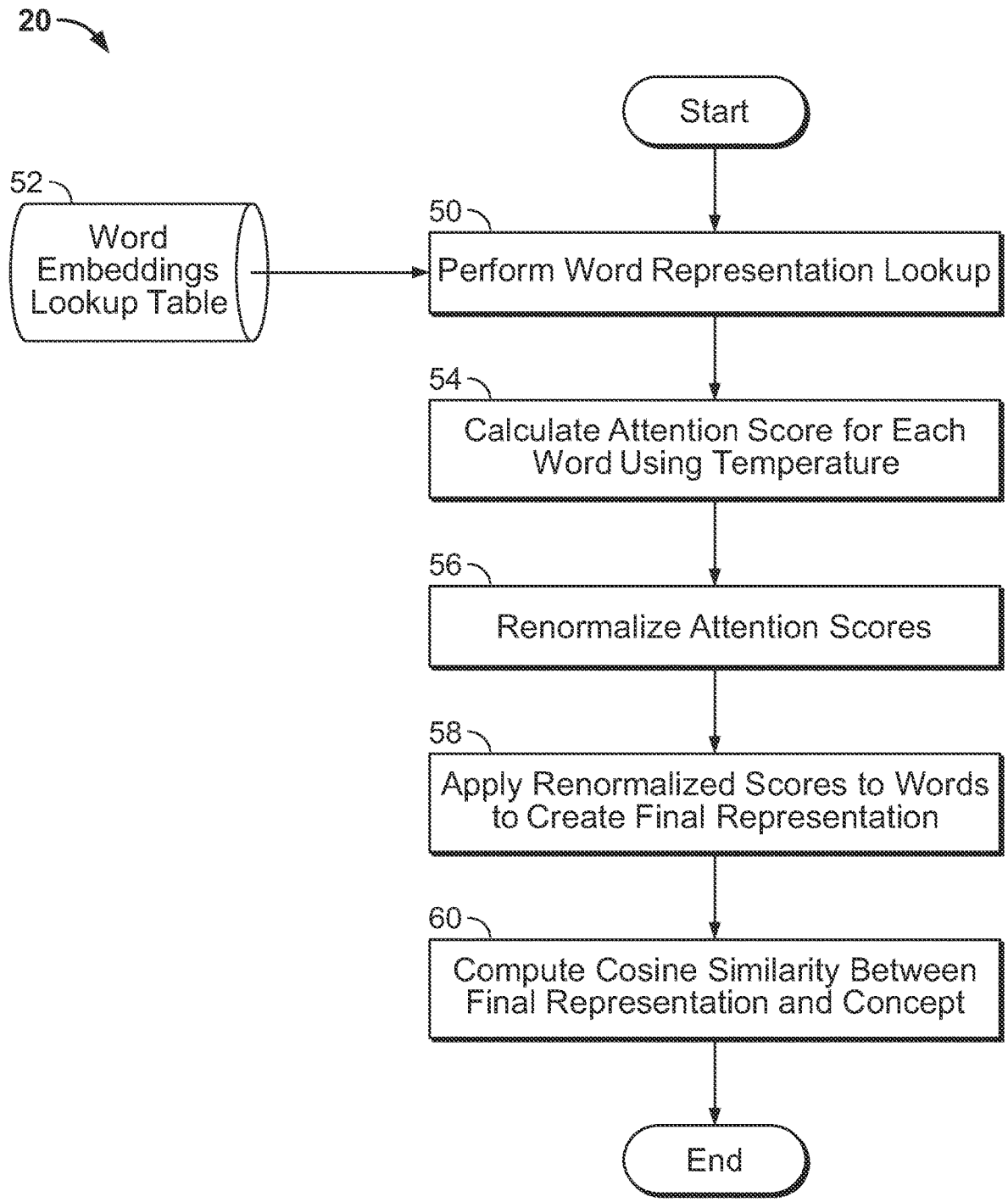
FIG. 3 is flowchart illustrating processing steps carried out by the system for attention scoring using temperature.

FIG. 3 is flowchart illustrating processing steps carried out by the system for attention scoring using temperature, indicated generally at 20. In step 50, the system performs a word representation lookup using a word embeddings lookup table 5. Then, in step 54, the system calculates an attention score for each word representation using an attention scoring algorithm having a temperature variable. The attention scoring algorithm could be of the following form:

$$\text{Softmax}(x_i, T) = \frac{\exp\left(\frac{x_i}{T}\right)}{\sum_i \exp\left(\frac{x_i}{t}\right)}$$

In step 56, the system renormalizes the attention scores. Next, in step 58, the system applies the renormalized scores to the word representations to create a final representation. Finally, in step 60, the system computes a cosine similarity between the final representation and a concept that the user desires to search for.

Figure 4:
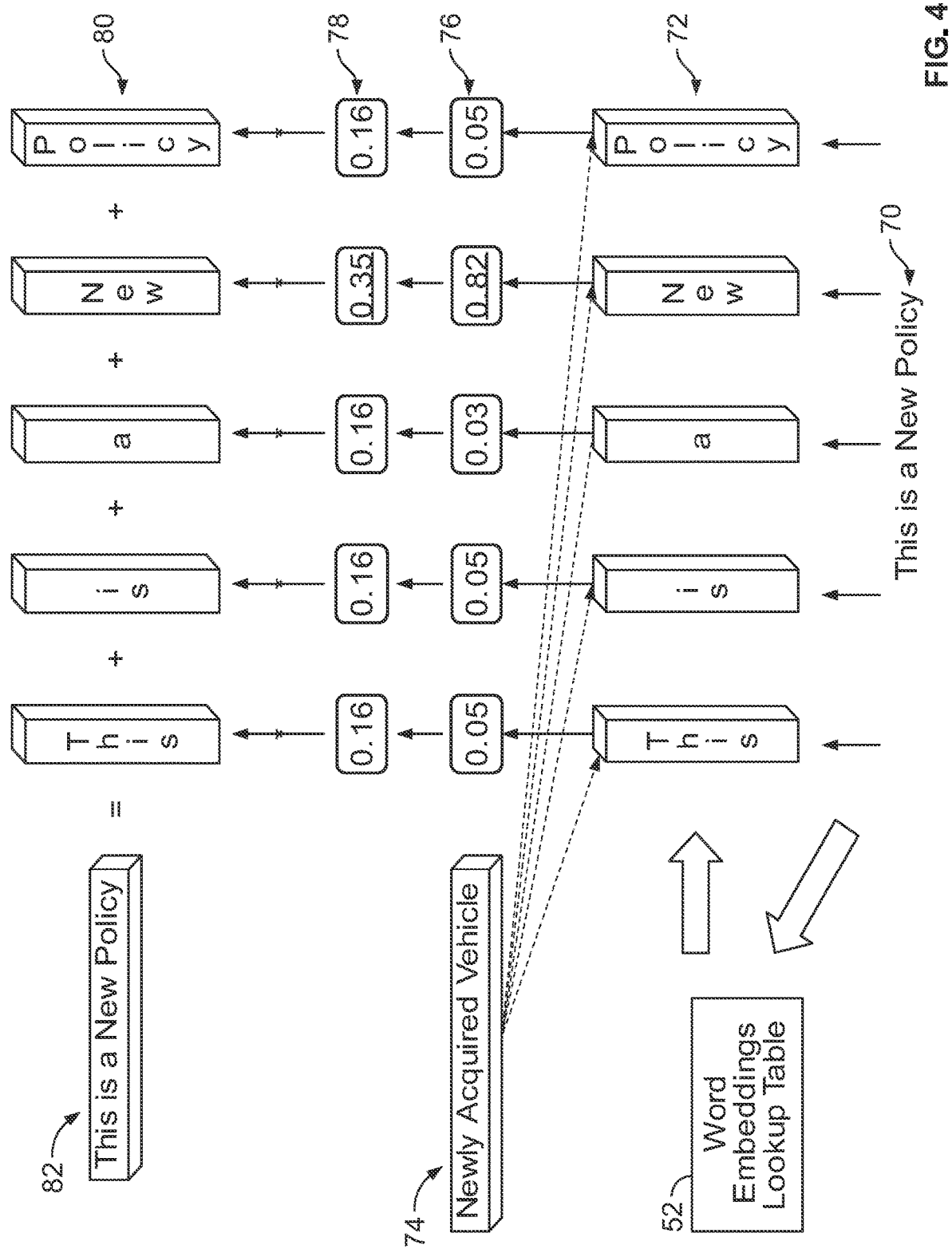
FIG. 4 is a diagram illustrating the attention scoring steps of FIG. 3.

FIG. 4 is a diagram illustrating the attention scoring steps of FIG. 3. As can be seen, the input sentence 70 to be processed is the sentence: "This is a new policy." The system processes the input sentence 70 using the word embeddings lookup table 52 to generate word representations (vectors) 72 (e.g., the discrete words "This," "is," "a," "new," and "policy"). Next, the system identifies the concept 74 to be searched for, which in this example is the concept of a newly acquired vehicle. In step 76, the system scores each of the word representations 72 using the attention scoring algorithm discussed in step 54 of FIG. 3, which processes each individual word representation 72 and the concept 74 to calculate an attention score 76 for each word presentation 72. The attention scores 76 are then normalized by the system to generate normalized attention scores 78. This process could be accomplished by renormalizing using a SoftMax function if one of the scores 76 is too high. The system generates a final (scored) representation 82 of the sentence 70 by applying the normalized attention scores 78 to the word representations 72 to create weighted word representations (vectors) 80 and concatenating the weighted word representations 80 to create the final representation 82. The final representation 82 is a weighted sum of the initial word representations (vectors) 72. Finally, the system calculates a cosine similarity between the final representation 82 and the concept 74. The cosine similarity is a numerical indication of the likelihood of the final representation representing 82 representing the concept 74.

It is noted that the temperature variable T of the attention scoring algorithm discussed herein improves conventional attention scoring by integrating into a sentence the importance of the concept desired by the user. Additionally, the re-normalization process discussed herein makes the system robust to false positives, and has particular applicability in cases where the attention coefficients are too high and the concept has several words.

Figure 5:
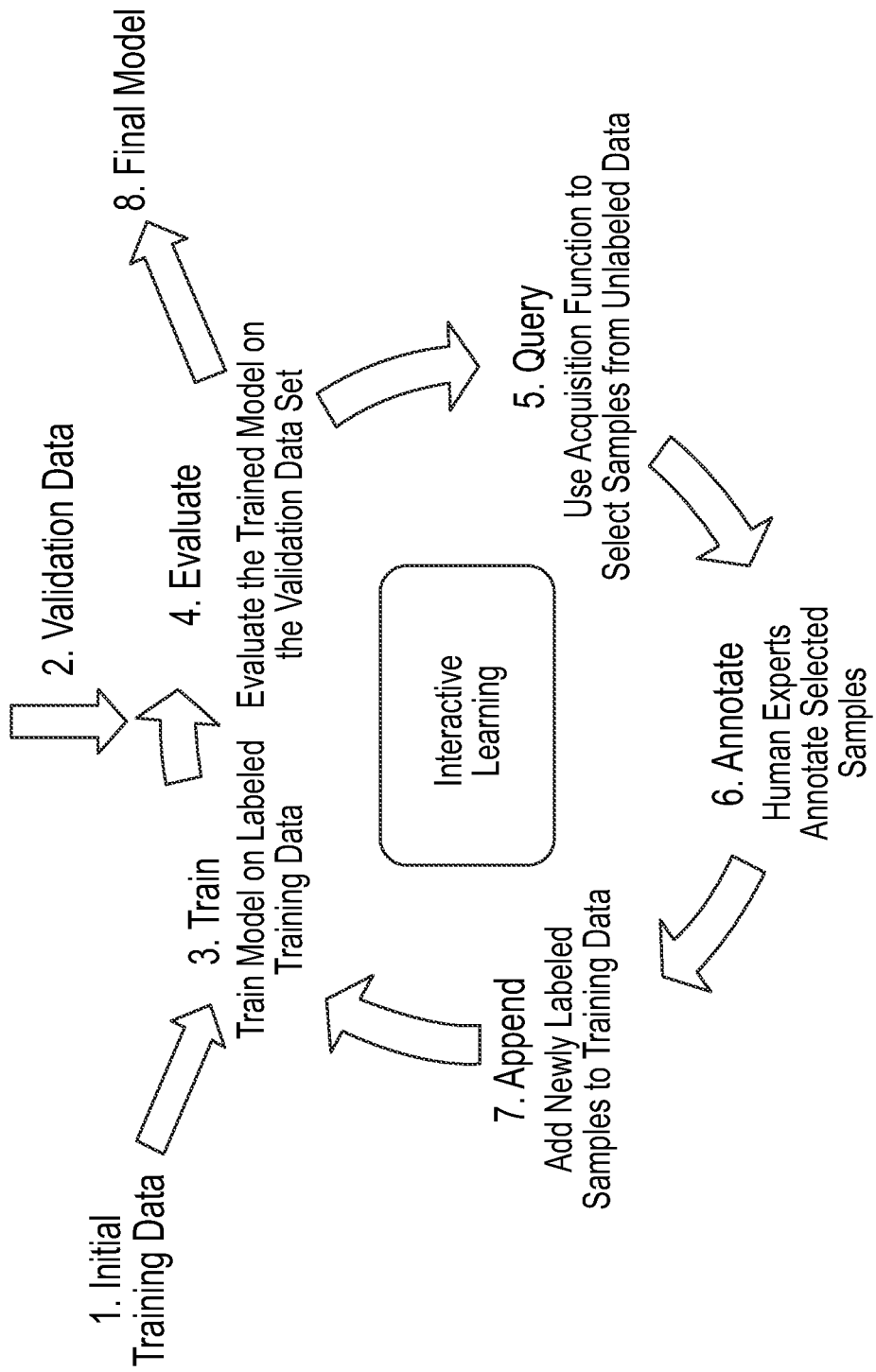
FIG. 5 is a diagram illustrating overall processing steps carried out by the system.

FIG. 5 is a diagram illustrating overall processing steps carried out by the system. As can be seen, the system implements a feedback loop. The initial training and validation data are processed by the system to train the model based on labeled training data as well as to evaluate the trained model on the validation data set. A final model can be generated from the valuation process, and additionally, the user can query the system to obtain samples of unlabeled data for further training of the system. In such circumstances, the user can annotate selected samples of unlabeled data, append the newly labeled data into the training data set, and the system can be re-trained using both the initial training data and the appended training data sets. This iterative process is referred to herein as interactive learning, as shown in FIG. 5.

Figure 6:
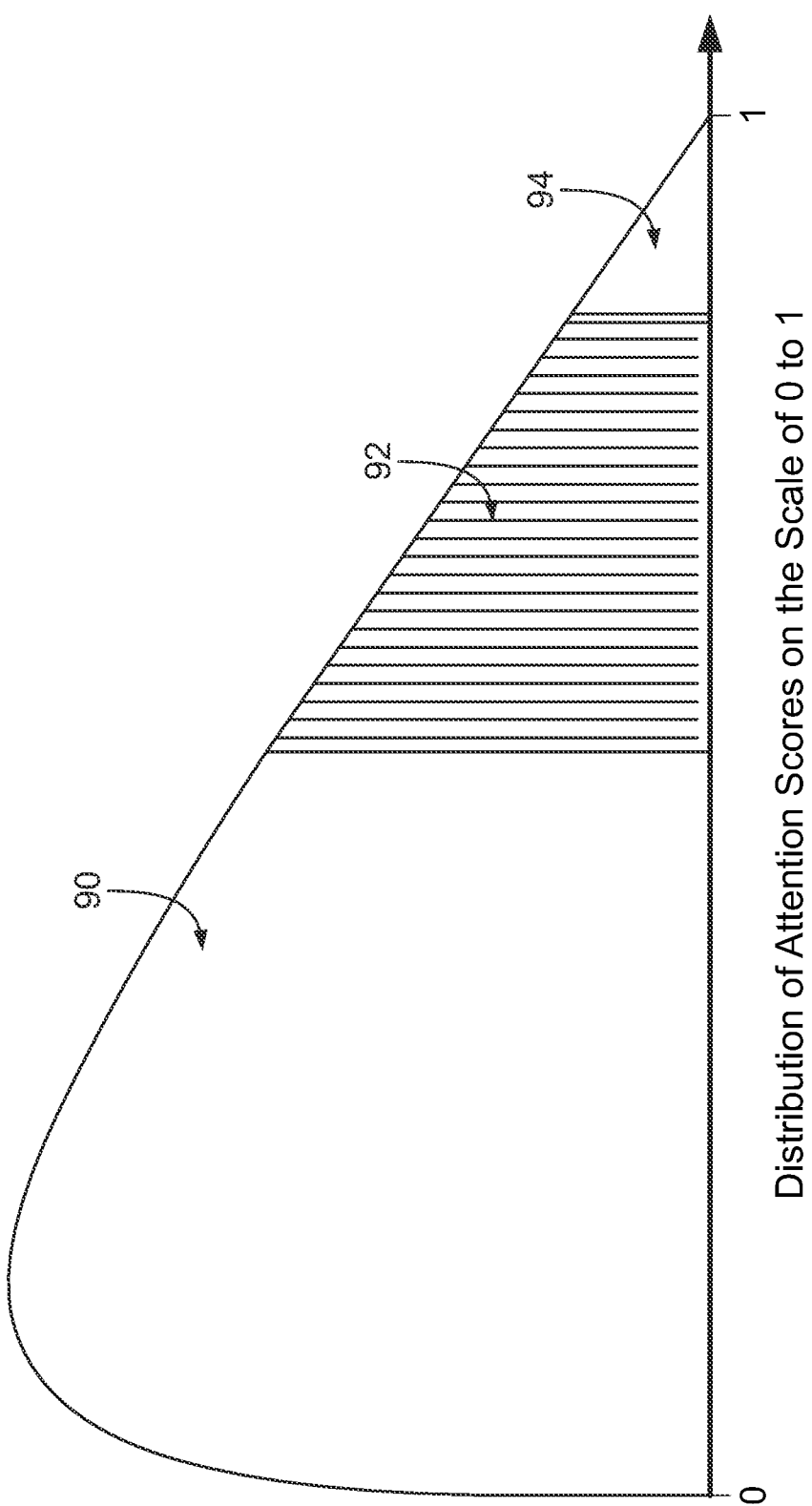
FIG. 6 is graph illustrating a distribution of attention scores generated by the system.

FIG. 6 is graph illustrating a distribution of attention scores generated by the system. The graph region 90 indicates negative examples, wherein data points up to the 75$^{th}$ percentile of the score distribution are taken as negative examples. The region 92 indicates "grey area" examples, wherein data points between the 51$^{st}$ and 75$^{th}$ percentiles of the score distribution are sent to the users for manual labeling/training. The region 94 indicates positive examples, and includes the top 50 examples based on attention scores which are split into two parts, with the bottom 25 examples being used as training data and the top 25 examples being used as test data.

Figure 7A:
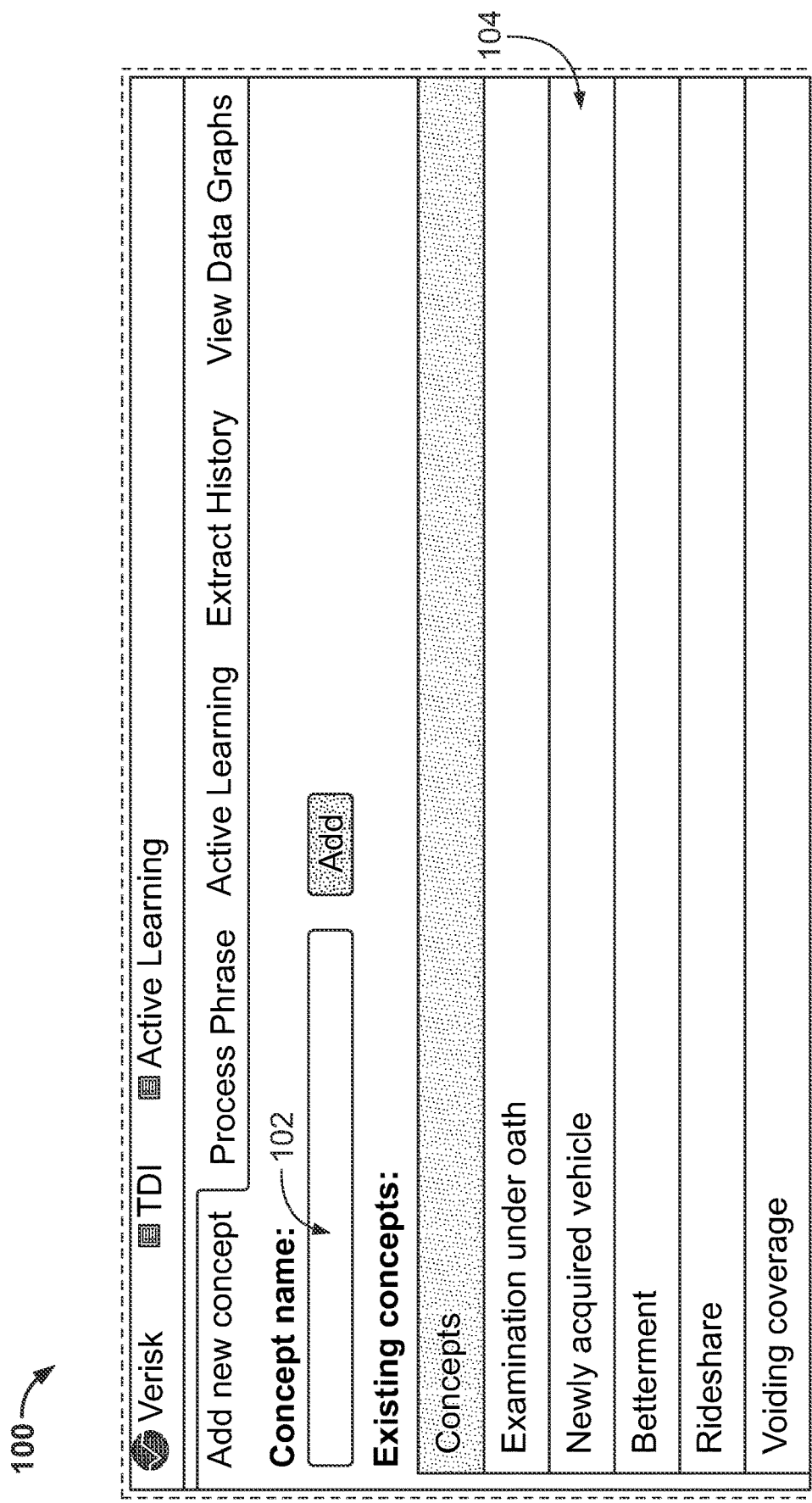

FIGS. 7A-7G are screenshots illustrating graphical user interface screens generated by the system for allowing a user to define high-level concepts for training of the machine learning system, and to manage training of the system. As shown in FIG. 7A, the user interface screen 100 allows a user to define a new concept name in field 102, or to select an existing concept from a pull-down list 104 of existing concepts. Additionally, there are various tables at the top of the screen 100 which allow the user to engage in a phrase processing phase, an active learning phase, a history extraction phase, and a data graph viewing phase.

Figure 7B:
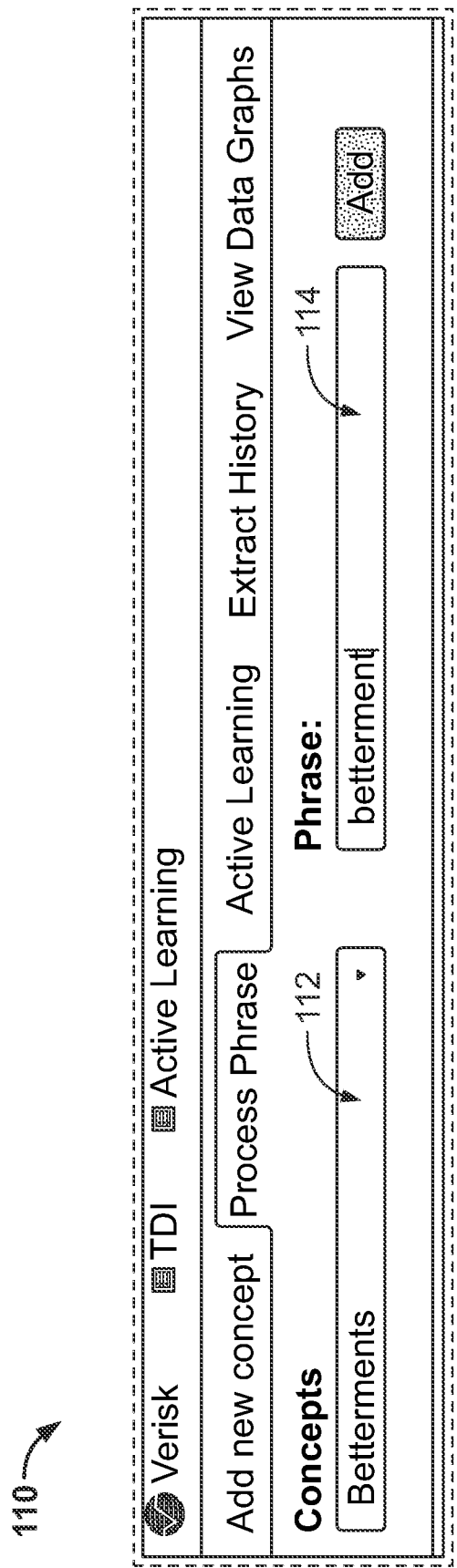

As shown in FIG. 7B, the user interface screen 100 allows a user to select a concept using field 112, and to define a phrase that is to be associated with the concept using field 114. This allows the user to assign particular phrases to the concepts, so as to improve the accuracy of the machine learning system. As can be seen in FIG. 7C, the screen 120 allows a user to validate one or more phrases 122 in connection with the previously-defined concept and phrase. Specifically, in each of the phrases 122, the user can indicate whether the phrase is or is not representative of the concept, or whether the user is unsure. Additionally, the user can discard one or more phrases, and save the phrases as training data.

As shown in FIG. 7D, the screen 130 allows a user to select a concept using the field 132, and to review training questions 134 associated with the selected concept. The user can provide feedback as to whether the training questions 134 are useful (by clicking the yes, no, and unsure radio buttons). Additionally, each question 134 includes feedback to the user as to the original model's guess as to whether the question is relevant to the selected concept, as well as a confidence score associated with the guess.

As shown in FIG. 7E, the screen 140 allows the user to monitor training of the system by specifying a concept and a phrase using the fields 142 and 144, and to monitor the current status of machine learning associated with each concept, including the name of the concept, the associated phrases, fixed test set accuracy results, automated test accuracy results, number of training iterations performed by the machine learning system, and the status of each training epoch (e.g., whether the model has finished training on a particular concept and is ready for active learning). As can be appreciated the screen 140 provides a convenient, easy-to-use dashboard for allowing a user to monitor the progress of concept-based machine learning being performed by the system, in real time.

As can be seen in FIG. 7F, the screen 150 allows a user to obtain information about particular forms (e.g., textual insurance-related forms) that are likely to have information relevant to a concept being searched. In the field 152, the user can specify a concept item, and in step 154, the system identifies forms that may have relevant information (and through which searching can be conducted). The field 156 identifies any matches identified by machine learning system, which can be selected by the user. The field 158 provides details about the form, and the fields 160 identify content that has been labeled as relevant to the concept being searched.

Figure 7G:
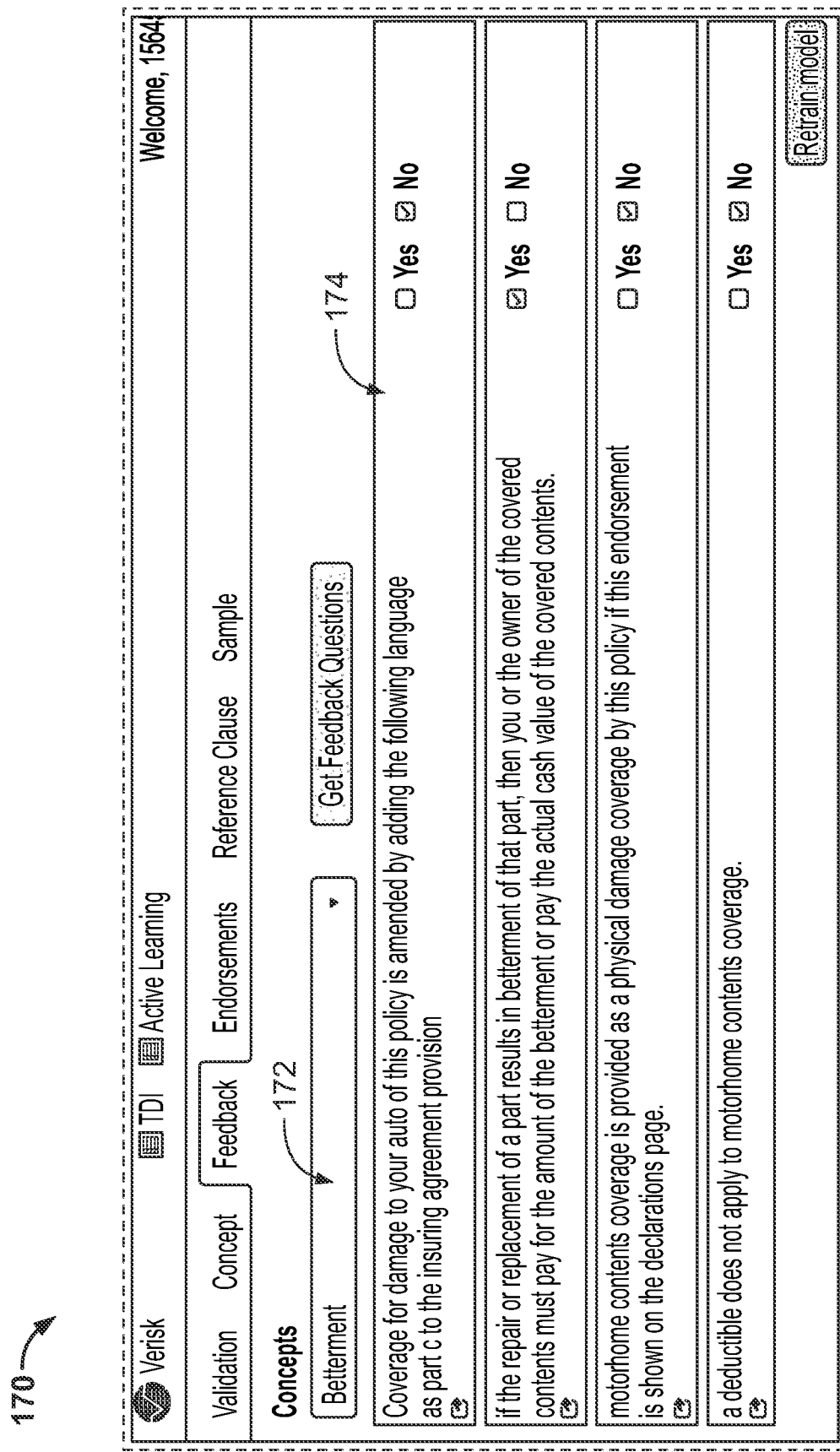

As can be seen in FIG. 7G, the screen 170 allows a user to provide feedback to the system (e.g., for further training of the system) by specifying a concept in field 172, and by providing yes/no feedback as to whether the displayed results in the fields 174 are relevant to the concept specified in the field 172.

Figure 8:
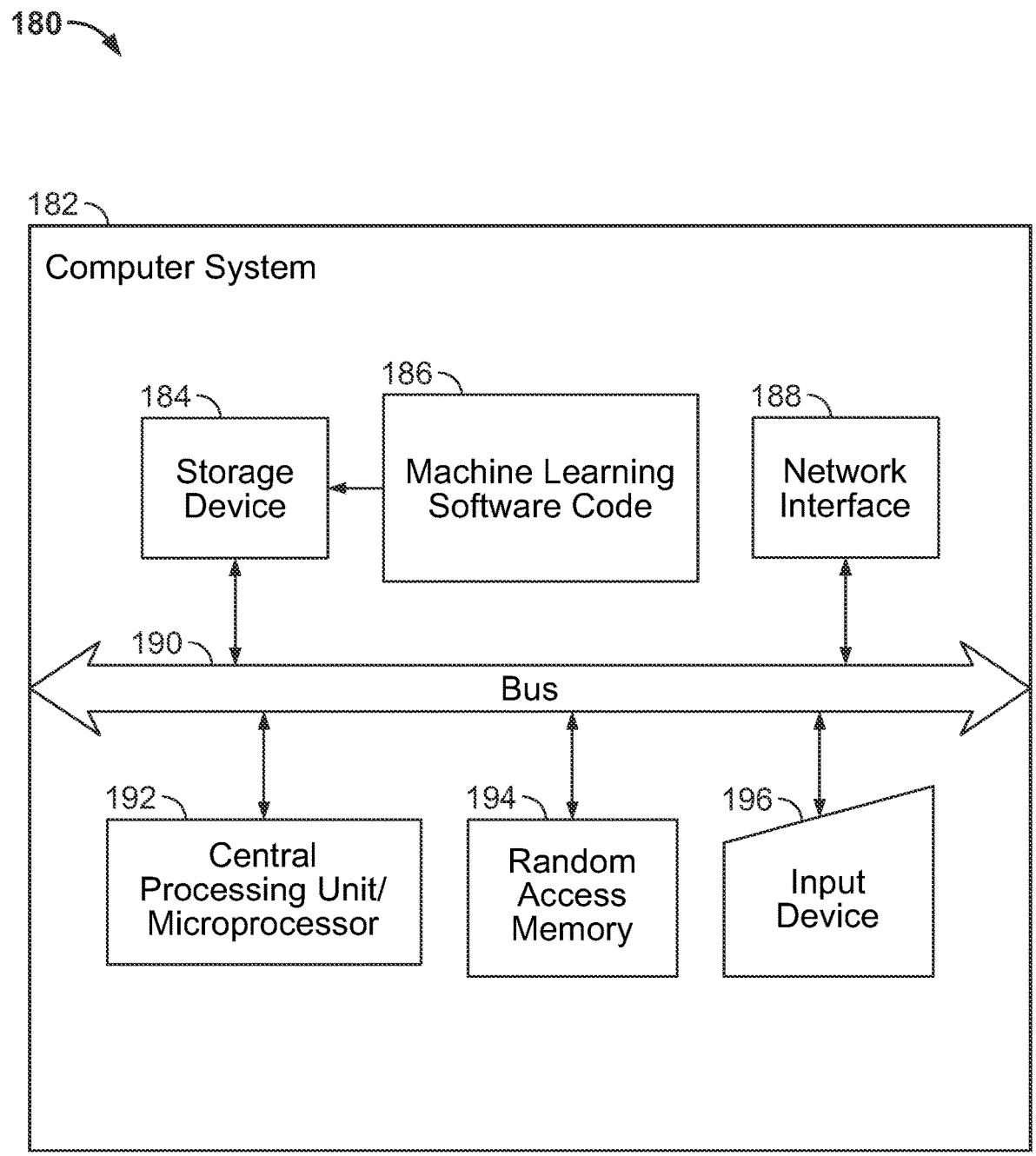
FIG. 8 is a diagram illustrating computer hardware and software components capable of being utilized to implement the machine learning systems and methods of the present disclosure.

It is noted that the systems and methods disclosed herein could allow for efficient sampling and labelling of training data, through the following processes:

a. Selection of Positive Examples
   i. Isolate top 50 examples in terms of scoring, split into 2 parts: training (bottom 25 labeled as positive) and test (top 25 labeled as positive)
 b. Selection of Grey Area
   i. From 51$^{st}$ example to the 75$^{th}$ percentile of the score distribution, use stratified sampling and select 100 examples sent to the user (uncertain about the label): 50 for training and 50 for test once labeled.
 c. Selection of Negative Examples
   i. Take overlap of sampled 5000 points out of all the points up to the 75$^{th}$ percentile of all phrases (one concept can have multiple phrases/ways of being formulated)
     1. The sampling method is the following: sample the negative examples in inverse proportion to their scores It is additionally noted that the systems and methods herein can allow provide for efficient interactive learning. Human-Machine interactive labelling based on the machine analysis of the most useful and important data points from which to obtain labels can be performed, using the following processes:

a. Uncertainty-based querying: Rank the sentences by entropy scores, which measures how uncertain the model is about the prediction of a sentence. Select the top 30 most uncertain sentences (e.g., entropy scores are equal to or greater than a threshold value indicative of top 30 most uncertain sentences) based on that ranking for user validation.
 b. False negative-based querying:
   1. Select negative predictions of the last iteration
   2. Sort by attention scores, select the top 15 sentences for each phrase
   3. Drop duplicates
   4. Find the highest score for each phrase to get a dummy point (highest score_phrase1, highest score_phrase2 . . . )
   5. Compute the Manhattan distances between all selected sentences and the dummy point
   6. Sort the points by the previous distance in ascending order pick the top 10 as potential false negative for user validation (e.g., Manhattan distances are less than a threshold value indicative of the top 10 false negative sentences).
 c. False positive-based queries:
   7. Using the attention score model, we extract the top three words in terms of scores (before normalization) for each sentence and each phrase
   8. Out of positive predictions in the last iteration:
     a. One Phrase
       i. Create one set per group of sentences which have the same top three words ii. For each of those groups:
  1. Compute the mean of the prediction confidence (mean_confidence)
  2. Compute the mean of the attention score (mean_score)
  3. Count the number of sentences in the set (count_sentence)
iii. Compute the mean of mean_confidence (confidence_cutoff) that can be referred to as a confidence threshold value.
iv. Compute the mean of mean_score (score_cutoff) that can be referred to as a score threshold value.
v. Keep the groups whose mean_confidence<confidence_cutoff and mean_score<score_cutoff
vi. Sort the groups by count_sentence in descending order and select the top 10 groups. As a result, we will have the largest groups whose positive prediction confidence was low.
vii. For each group:
  1. Select the top sentence with the largest confidence<confidence_cutoff
b. Multiple Phrases
  i. Apply the same algorithm except that we group the sentences using the concatenation of the top three words for each phrase FIG. 8 is a diagram 180 showing hardware and software components of a computer system 182 on which the system 10 of the present disclosure can be implemented. The computer system 182 can include a storage device 184, machine learning software code 186, a network interface 188, a communications bus 190, a central processing unit (CPU) (microprocessor) 192, random access memory (RAM) 194, and one or more input devices 196, such as a keyboard, mouse, etc. It is noted that the CPU 192 could also include, or be configured as, one or more graphics processing units (GPUs). The computer system 182 could also include a display (e.g., liquid crystal display (LCD), cathode ray tube (CRT), and the like). The storage device 184 could comprise any suitable computer-readable storage medium, such as a disk, non-volatile memory (e.g., read-only memory (ROM), erasable programmable ROM (EPROM), electrically-erasable programmable ROM (EEPROM), flash memory, field-programmable gate array (FPGA), and the like). The computer system 182 could be a networked computer system, a personal computer, a server, a smart phone, tablet computer, etc. It is noted that the server 182 need not be a networked server, and indeed, could be a stand-alone computer system.

The functionality provided by the present disclosure could be provided by machine learning software code 186, which could be embodied as computer-readable program code (e.g., algorithm) stored on the storage device 184 and executed by the CPU 192 using any suitable, high or low level computing language, such as Python, Java, C, C++, C#, .NET, MATLAB, etc. The network interface 188 could include an Ethernet network interface device, a wireless network interface device, or any other suitable device which permits the computer system 182 to communicate via a network. The CPU 192 could include any suitable single-core or multiple-core microprocessor of any suitable architecture that is capable of implementing and running the machine learning software code 186 (e.g., Intel processor). The random access memory 194 could include any suitable, high-speed, random access memory typical of most modern computers, such as dynamic RAM (DRAM), etc.

Having thus described the systems and methods in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following Claims.

The invention claimed is:

1. A machine learning system for interactive concept search, comprising:
a memory; and
a processor in communication with the memory, the processor: receiving textual data;
identifying one or more word representations of the textual data;
receiving a concept;
determining a score indicative of a likelihood of each of the one or more word representations being representative of the concept using an attention scoring process having a temperature variable;
generating a dataset for training and evaluation based at least in part on the score, the dataset comprising the one or more word representations and the concept, wherein the processor generates the dataset by:
  selecting a word representation of the one or more word presentations as a positive example based at least in part on determining that the score of the word representation is equal to or greater than a first percentile of a score distribution;
  selecting a word representation of the one or more word presentations as a negative example based at least in part on determining that the score of the word representation is less than a second percentile of a score distribution;
  selecting a word representation of the one or more word presentations as a grey area example based at least in part on determining that the score of the word representation is in a range between the first percentile of a score distribution and the second percentile of the score distribution, and sending the word representation to a user for manual labeling and training; and
processing the dataset to train one or more deep active learning models capable of the interactive concept search.

2. The machine learning system of claim 1, wherein the processor further performs the steps of:
normalizing the score of each of the one or more word representations;
creating a final representation by weighting each of the one or more word representations using the normalized score, wherein the final representation is weighted sum of the one or more word representations; and
determining a cosine similarity between the final representation and the concept, wherein the cosine similarity is a numerical indication of the likelihood of the final representation representing the concept.

3. The machine learning system of claim 1, wherein the processor further performs the steps of:
determining a confidence associated with a prediction on the dataset using the one or more deep active learning models;

sending the prediction to a user for labeling and training based at least in part on determining that the confidence is less than a threshold value; or
soliciting a user feedback on prediction based at least in part on determining that the he confidence is equal to or greater than a threshold value.

4. The machine learning system of claim 1, wherein the processor further performs the steps of:
receiving a query to obtain samples;
labeling the samples; and
adding the labeled samples to the dataset.

5. The machine learning system of claim 4, wherein the query comprises an uncertainty-based querying, wherein the processor further performs the steps of:
determining an entropy score associated with the dataset, the entropy score measuring how uncertain the one or more deep active learning models are about a prediction of the dataset; and
sending the dataset to a user for validation based at least in part on determining that the entropy score is equal to or greater than a threshold value.

6. The machine learning system of claim 4, wherein the query comprises a false-negative-based querying, wherein the processor further performs the steps of:
determining that the dataset has a negative prediction;
determining a dummy point associated with the dataset;
compute a Manhattan distance between the dataset and the dummy point; and
sending the dataset to a user for validation based at least in part on determining that the Manhattan distance is less than a threshold value.

7. The machine learning system of claim 4, wherein the query comprises a false-positive-based querying, wherein the processor further performs the steps of:
determining that the dataset has a positive prediction; and
sending the dataset to a user for validation based at least in part on determining that a confidence associated with the dataset is less than a confidence threshold value and a score associated with the dataset is less than a score threshold value.

8. The machine learning system of claim 1, wherein the processor identifies the one or more word representations by processing the textual data using a word embeddings lookup table to generate the one or more word representations.

9. The machine learning system of claim 1, wherein the processor further performs the step of:
preprocessing the textual data using one or more of removing special characters, converting all uppercase letters to lowercase, replacing rare words with a token, and removing stop words from the textual data.

10. A machine learning method for interactive concept search, comprising:
receiving textual data;
identifying one or more word representations of the textual data receiving a concept;
determining a score indicative of a likelihood of each of the one or more word representations being representative of the concept using an attention scoring process having a temperature variable;
generating a dataset for training and evaluation based at least in part on the score, the dataset comprising the one or more word representations and the concept, wherein the dataset is generated by:
selecting a word representation of the one or more word presentations as a positive example based at least in part on determining that the score of the word representation is equal to or greater than a first percentile of a score distribution;
selecting a word representation of the one or more word presentations as a negative example based at least in part on determining that the score of the word representation is less than a second percentile of a score distribution;
selecting a word representation of the one or more word presentations as a grey area example based at least in part on determining that the score of the word representation is in a range between the first percentile of a score distribution and the second percentile of the score distribution, and sending the word representation to a user for manual labeling and training; and
processing the dataset to train one or more deep active learning models capable of the interactive concept search.

11. The machine learning method of claim 10, further comprising:
normalizing the score of each of the one or more word representations;
creating a final representation by weighting each of the one or more word representations using the normalized score, wherein the final representation is weighted sum of the one or more word representations; and
determining a cosine similarity between the final representation and the concept, wherein the cosine similarity is a numerical indication of the likelihood of the final representation representing the concept.

12. The machine learning method of claim 10, further comprising:
determining a confidence associated with a prediction on the dataset using the one or more deep active learning models;
sending the prediction to a user for labeling and training based at least in part on determining that the confidence is less than a threshold value; or
soliciting a user feedback on prediction based at least in part on determining that the he confidence is equal to or greater than a threshold value.

13. The machine learning method of claim 10, further comprising:
receiving a query to obtain samples;
labeling the samples; and
adding the labeled samples to the dataset.

14. The machine learning method of claim 13, wherein the query comprises an uncertainty-based querying, the method further comprising:
determining an entropy score associated with the dataset, the entropy score measuring how uncertain the one or more deep active learning models are about a prediction of the dataset; and
sending the dataset to a user for validation based at least in part on determining that the entropy score is equal to or greater than a threshold value.

15. The machine learning method of claim 13, wherein the query comprises a false-negative-based querying, the method further comprising:
determining that the dataset has a negative prediction;
determining a dummy point associated with the dataset;
compute a Manhattan distance between the dataset and the dummy point; and
sending the dataset to a user for validation based at least in part on determining that the Manhattan distance is less than a threshold value.

16. The machine learning method of claim 13, wherein the query comprises a false-positive-based querying, the method further comprising:
  determining that the dataset has a positive prediction; and
  sending the dataset to a user for validation based at least in part on determining that a confidence associated with the dataset is less than a confidence threshold value and a score associated with the dataset is less than a score threshold value.

17. The machine learning method of claim 10, wherein the step of identifying the one or more word representations comprises processing the textual data using a word embeddings lookup table to generate the one or more word representations.

18. The machine learning method of claim 10, further comprising:
  preprocessing the textual data using one or more of removing special characters, converting all uppercase letters to lowercase, replacing rare words with a token, and removing stop words from the textual data.

19. A non-transitory computer readable medium having instructions stored thereon for interactive concept search which, when executed by a processor, causes the processor to carry out the steps of:
  receiving textual data;
  identifying one or more word representations of the textual data;
  receiving a concept;
  determining a score indicative of a likelihood of each of the one or more word representations being representative of the concept using an attention scoring process having a temperature variable;
  generating a dataset for training and evaluation based at least in part on the score, the dataset comprising the one or more word representations and the concept, wherein the dataset is generated by:
    selecting a word representation of the one or more word presentations as a positive example based at least in part on determining that the score of the word representation is equal to or greater than a first percentile of a score distribution;
    selecting a word representation of the one or more word presentations as a negative example based at least in part on determining that the score of the word representation is less than a second percentile of a score distribution;
    selecting a word representation of the one or more word presentations as a grey area example based at least in part on determining that the score of the word representation is in a range between the first percentile of a score distribution and the second percentile of the score distribution, and sending the word representation to a user for manual labeling and training; and
  processing the dataset to train one or more deep active learning models capable of the interactive concept search.

20. The non-transitory computer readable medium of claim 19, further comprising the steps of:
  normalizing the score of each of the one or more word representations;
  creating a final representation by weighting each of the one or more word representations using the normalized score, wherein the final representation is weighted sum of the one or more word representations; and
  determining a cosine similarity between the final representation and the concept, wherein the cosine similarity is a numerical indication of the likelihood of the final representation representing the concept.

21. The non-transitory computer readable medium of claim 19, further comprising the steps of:
  determining a confidence associated with a prediction on the dataset using the one or more deep active learning models;
  sending the prediction to a user for labeling and training based at least in part on determining that the confidence is less than a threshold value; or
  soliciting a user feedback on prediction based at least in part on determining that the he confidence is equal to or greater than a threshold value.

22. The non-transitory computer readable medium of claim 19, further comprising the steps of:
  receiving a query to obtain samples;
  labeling the samples; and
  adding the labeled samples to the dataset.

23. The non-transitory computer readable medium of claim 22, wherein the query comprises an uncertainty-based querying, further comprising the steps of:
  determining an entropy score associated with the dataset, the entropy score measuring how uncertain the one or more deep active learning models are about a prediction of the dataset; and
  sending the dataset to a user for validation based at least in part on determining that the entropy score is equal to or greater than a threshold value.

24. The non-transitory computer readable medium of claim 22, wherein the query comprises a false-negative-based querying, further comprising the steps of:
  determining that the dataset has a negative prediction;
  determining a dummy point associated with the dataset;
  compute a Manhattan distance between the dataset and the dummy point; and
  sending the dataset to a user for validation based at least in part on determining that the Manhattan distance is less than a threshold value.

25. The non-transitory computer readable medium of claim 22, wherein the query comprises a false-positive-based querying, further comprising the steps of:
  determining that the dataset has a positive prediction; and
  sending the dataset to a user for validation based at least in part on determining that a confidence associated with the dataset is less than a confidence threshold value and a score associated with the dataset is less than a score threshold value.

26. The non-transitory computer readable medium of claim 19, wherein identifying the one or more word representations comprises the step of processing the textual data using a word embeddings lookup table to generate the one or more word representations.

27. The non-transitory computer readable medium of claim 19, further comprising the steps of:
  preprocessing the textual data using one or more of removing special characters, converting all uppercase letters to lowercase, replacing rare words with a token, and removing stop words from the textual data.

* * * * *

UNITED STATES PATENT AND TRADEMARK OFFICE
CERTIFICATE OF CORRECTION

| | |
|---|---|
| PATENT NO. | : 11,550,782 B2 |
| APPLICATION NO. | : 17/547784 |
| DATED | : January 10, 2023 |
| INVENTOR(S) | : Charles Dognin et al. |

It is certified that error appears in the above-identified patent and that said Letters Patent is hereby corrected as shown below:

In the Claims

In Column 9, Line 5, Claim 3, the word "he" should be deleted;

In Column 10, Line 41, Claim 12, the word "he" should be deleted; and

In Column 12, Line 16, Claim 21, the word "he" should be deleted.

Signed and Sealed this
Sixteenth Day of May, 2023

*Katherine Kelly Vidal*

Katherine Kelly Vidal
*Director of the United States Patent and Trademark Office*